(12) United States Patent
Tuomivaara et al.

(10) Patent No.: US 8,596,045 B2
(45) Date of Patent: Dec. 3, 2013

(54) ON-BOARD-DIAGNOSIS METHOD FOR AN EXHAUST AFTERTREATMENT SYSTEM AND ON-BOARD-DIAGNOSIS SYSTEM FOR AN EXHAUST AFTERTREATMENT SYSTEM

(75) Inventors: Anders Tuomivaara, Göteborg (SE); Jonas Jansson, Göteborg (SE); Lucas Megas, Göteborg (SE); Lennart Andersson, Varberg (SE); Jonas Edvardsson, Möindal (SE); Carl-Johan Karlsson, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 581 days.

(21) Appl. No.: 12/528,091

(22) PCT Filed: Feb. 21, 2008

(86) PCT No.: PCT/SE2008/000150
§ 371 (c)(1),
(2), (4) Date: Dec. 2, 2009

(87) PCT Pub. No.: WO2008/103113
PCT Pub. Date: Aug. 28, 2008

(65) Prior Publication Data
US 2010/0101213 A1    Apr. 29, 2010

(30) Foreign Application Priority Data
Feb. 21, 2007  (SE) ........................ 0700439

(51) Int. Cl.
*F01N 3/035*  (2006.01)
(52) U.S. Cl.
USPC ............................................. 60/295; 60/297

(58) Field of Classification Search
USPC ............................ 60/277, 295, 297, 311, 301
See application file for complete search history.

(56) References Cited

U.S. PATENT DOCUMENTS

| | | | |
|---|---|---|---|
| 6,817,174 B1 * | 11/2004 | Igarashi et al. | ................. 60/295 |
| 7,155,334 B1 | 12/2006 | Stewart et al. | |
| 2003/0140621 A1 | 7/2003 | Khair et al. | |
| 2003/0209011 A1 | 11/2003 | Duvinage et al. | |
| 2004/0098979 A1 | 5/2004 | Hammerle et al. | |
| 2006/0153761 A1 * | 7/2006 | Bandl-Konrad et al. | .. 423/239.1 |
| 2008/0022659 A1 | 1/2008 | Viola et al. | |

FOREIGN PATENT DOCUMENTS

WO            9939809 A1    8/1999

* cited by examiner

*Primary Examiner* — Thomas Denion
*Assistant Examiner* — Jonathan Matthias
(74) *Attorney, Agent, or Firm* — WRB-IP LLP

(57) ABSTRACT

A system and an on-board-diagnosis method is provided for an exhaust aftertreatment system of an engine including a diesel particulate filter unit which encompasses a particulate filter in which soot can be oxidized by NO2 and constituents of the exhaust gas are deoxidized in a nitrogen-oxides reduction unit arranged downstream of the diesel particulate filter unit, wherein the exhaust gas flows from the diesel particulate filter unit to the nitrogen-oxides reduction unit. The on-board-diagnosis method includes estimating an NO2 content upstream of the nitrogen-oxides reduction unit, measuring at least one of an NOx or NO2 content upstream of the nitrogen-oxides reduction unit, performing a comparison between the estimated and the measured contents, and, based on the result of the comparison deciding on at least one conditioning step of the diesel particulate filter unit.

19 Claims, 3 Drawing Sheets

ON-BOARD-DIAGNOSIS METHOD FOR AN EXHAUST AFTERTREATMENT SYSTEM AND ON-BOARD-DIAGNOSIS SYSTEM FOR AN EXHAUST AFTERTREATMENT SYSTEM

BACKGROUND AND SUMMARY

The invention relates to an on-board-diagnosis method for an exhaust aftertreatment system and an on-board-diagnosis system for an exhaust aftertreatment system.

Present regulatory conditions in the automotive market have led to an increasing demand to improve fuel economy and reduce emissions in present vehicles. These regulatory conditions must be balanced with the demands of a consumer for high performance and quick response for a vehicle.

A diesel engine has an efficiency of up to about 52% and is thus the best converter of fossil energy. NOx emission concentration, i.e. the emission of nitrogen oxides NO and NO2, is dependent upon local oxygen atom concentration and the local temperature. Said high efficiency is however only possible at an elevated combustion temperature at which high NOx levels are inevitable. Moreover, a suppression of NOx formation by internal means (air/fuel ratio) has the tendency to cause an increase in particulates, known as the NOx—particulates trade off. Furthermore, an excess of oxygen in the exhaust gas from a diesel engine prevents the use of stoichiometric 3-way-catalyst technology for reduction of NOx as, is used in gasoline engine oars from the late 80-ties.

Both carbon particulates and NOx are typical emissions in the exhaust gas of diesel engines. Requirements for reducing such emissions increase and trigger various approaches in the art to reduce emissions. In the European patent EP 1 054 722 B1 an exhaust aftertreatment system is disclosed which combines a particulate filter collecting soot and nitrogen-oxides reduction catalysts in the exhaust tract. For removing soot NO2 is generated by oxidation of NO in an oxidation catalyst. Soot which is collected in a particulate filter is oxidized by NO2. Residual amounts of NO and NO2 in the exhaust gas are reduced to nitrogen gas in a selective-catalytic-reduction catalyst (SCR catalyst) by injecting ammonia into the SCR catalyst.

During operation all catalysts degrade due to accumulation of poisons, thermal migration of the catalyst material etc. This degradation seriously influences the operation of aftertreatment systems. Therefore it is desirable to detect the degradation of a catalyst in the aftertreatment system before the operation of the aftertreatment system fails or legal requirements cannot be fulfilled because of the degradation. This is done by the so called OBD (On-Board Diagnosis).

It is desirable to provide an improved on-board-diagnosis method for an exhaust aftertreatment system. It is also desirable to provide an adequate improved exhaust aftertreatment system.

An on-board-diagnosis method for an exhaust aftertreatment system of an engine is proposed comprising a diesel particulate filter unit which encompasses a particulate filter (DPF) in which soot can be oxidized by NO2 and constituents of the exhaust gas are deoxidized in a selective-catalytic-reduction (SCR) catalyst arranged downstream of the diesel particulate filter unit, wherein the exhaust gas flows from the diesel particulate filter unit to the selective-catalytic-reduction catalyst. According to invention an NO2 content upstream of the nitrogen-oxides reduction unit is estimated; at least one of an NOx or NO2 content upstream of the nitrogen-oxides reduction unit is measured; a comparison between the estimated and the measured contents is performed; and based on the result of the comparison it is decided on at least one conditioning step of the diesel particulate filter unit.

Favourably, the proper operation of the diesel particulate filter unit can be reliably checked on board of a vehicle which is equipped with said aftertreatment system, improving the environmental compatibility of diesel engines. This can be done based on the NO2 level in the exhaust gas on particular locations and/or based on the efficiency of the nitrogen-oxides reduction unit.

Preferably for high load operation conditions of the engine, the following steps can be performed: measuring the NO2 content in the exhaust gas upstream of the nitrogen-oxides reduction unit and downstream of the diesel particulate filter unit; calculating the NO2 content in the exhaust gas upstream of the nitrogen-oxides reduction unit and downstream of the diesel particulate filter unit; measuring an NOx content in the exhaust gas downstream of the nitrogen-oxides reduction unit; measuring or calculating an NOx content in the exhaust gas upstream of the nitrogen-oxides reduction unit and downstream of the diesel particulate filter unit; comparing the measured and the expected NO2 contents; and based on the result of the comparison deciding on at least one conditioning step of the diesel particulate filter unit.

Favourably the operability of the diesel particulate filter unit can be determined with high accuracy.

Preferably for low load operation conditions of the engine, the following steps can be performed: calculating the NO2 content in the exhaust gas upstream of the nitrogen-oxides reduction unit and downstream of the diesel particulate filter unit; measuring or measuring and calculating an NOx content in the exhaust gas upstream of the nitrogen-oxides reduction unit and downstream of the diesel particulate filter unit; measuring the NOx content in the exhaust gas downstream of the nitrogen-oxides reduction unit; and deriving the efficiency of the NOx conversion in the nitrogen-oxides reduction unit from the calculated NO2 and the measured and calculated NOx contents. Favourably, a real NO2 sensor is not necessary as the NO2 content can be calculated, this embodiment thus needs less hardware and is cost efficient. If the efficiency of the nitrogen-oxides reduction unit is not sufficient, a separate diagnosis for the nitrogen-oxides reduction unit as well as for a reducing-agent system (in case a SCR catalyst is used with injection of a reducing agent), can be triggered. This can be done after the regeneration related to the diesel particulate filter unit or before the regeneration.

Preferably, a conditioning step can be performed if the difference between the compared NOx conversions and/or the compared NO2 contents are beyond a predetermined value.

Particularly, the NOx conversion or the compared NO2 contents in the exhaust gas can be derived by determining the NO2 content with a real sensor and/or a virtual sensor.

Deriving the NOx conversion in the exhaust gas can be advantageously done by determining an efficiency of the nitrogen-oxides reduction unit.

Another advantage with the present invention is that one may achieve high passive regeneration and HC oxidation in the DPF system and maintaining a good NO2/NO ratio for high NOx-conversion in the SCR-system for a fresh as well as an aged system. Advantageously, the preferred arrangement allows to using a smaller SCR-catalyst, giving both cost, space and weight benefits. The diesel particulate filter unit (DPFU) may have the oxidation catalyst (DOC) upstream of the diesel particulate filter (DPF). Alternatively or additionally, the DPF may comprise a catalytic coating which oxidizes exhaust gas components and which can replace or support the DOC. An advantage with this embodiment is that one will still further save space, cost and weight.

Preferably, a conditioning step can be performed if the differences between the compared NOx conversions and/or the compared NO2 contents are beyond a predetermined value.

The NOx conversion and/or the NO2 contents can be derived by determining the NO2 content in the exhaust gas with a real sensor and/or a virtual sensor. Alternatively or additionally, NOx conversion can be derived from the efficiency of the nitrogen-oxides reduction unit without using a real NO2 sensor.

Preferably a first conditioning step can be performed by heating an oxidation stage in the diesel particulate filter unit to at least 350° C., preferable to a temperature between 350° C. and 450 C.

Favourably, a second conditioning step can be performed by heating an oxidation stage in the diesel particulate filter unit to at least 450° C., preferable to a temperature between 450° C. and 550° C.

Advantageously, a third conditioning step is performed by heating an oxidation stage in the diesel particulate filter unit to at least 550° C., preferable to a temperature between 550° C. and 650° C.

Particularly, the second conditioning step can be performed after the first conditioning step and the third conditioning step can be performed after the second conditioning step. After each conditioning step it is decided if a further conditioning step has to be performed or not. The thermal load to the particulate filter unit is favourably reduced to the bare necessary heating steps and temperatures.

Wall conditioning steps have been unsuccessful, after performing all conditioning steps unsuccessfully, an alarm can be set.

According to another aspect of the invention, an exhaust aftertreatment system of an engine is proposed comprising a diesel particulate filter unit which encompasses a particulate filter in which soot can be oxidized by NO2 and constituents of the exhaust gas are deoxidized in a nitrogen-oxides reduction unit arranged downstream of the diesel particulate filter unit, wherein the exhaust gas flows from the diesel particulate filter unit to the nitrogen-oxides reduction unit, wherein the operability of at least the diesel particulate filter unit can be determined by calculating the NO2 content in the exhaust gas upstream of the nitrogen-oxides reduction unit and downstream of the diesel particulate filter unit; measuring or calculating an NOx content in the exhaust gas upstream of the nitrogen-oxides reduction unit and downstream of the diesel particulate filter unit; measuring the NOx content in the exhaust gas downstream of the nitrogen-oxides reduction unit; calculating the NOx content in the exhaust gas upstream of the nitrogen-oxides reduction unit and downstream of the diesel particulate filter unit; and deriving the actual and the expected NOx conversion from the calculated NO2 and the measured and calculated NOx contents.

Preferably an NO2 sensor can be provided upstream of the selective-catalytic-reduction catalyst and downstream of the diesel particulate filter unit. Additionally or alternatively, the NO2 sensor can be provided downstream of the nitrogen-oxides reduction unit. The NO2 sensor can be a real sensor implemented as hardware or a virtual sensor implemented as software where the NO2 content is calculated based on appropriate operation parameters of the engine and the exhaust gas aftertreatment system.

According to a further aspect of the invention, a computer program is proposed which is storable on a computer readable medium, comprising a program code for use in an on-board-diagnosis method for an exhaust aftertreatment system of an engine comprising a diesel particulate filter unit which encompasses a particulate filter in which soot can be oxidized by NO2 and constituents of the exhaust gas are deoxidized in a nitrogen-oxides reduction unit arranged downstream of the diesel particulate filter unit, wherein the exhaust gas flows from the diesel particulate filter unit to the selective-catalytic-reduction catalyst, comprising at least the steps of calculating the NO2 content in the exhaust gas upstream of the nitrogen-oxides reduction unit and downstream of the diesel particulate filter unit; measuring or calculating an NOx content in the exhaust gas upstream of the nitrogen-oxides reduction unit and downstream of the diesel particulate filter unit; measuring the NOx content in the exhaust gas downstream of the nitrogen-oxides reduction unit; calculating the NOx content in the exhaust gas upstream of the nitrogen-oxides reduction unit and downstream of the diesel particulate filter unit; and deriving the actual and the expected NOx conversion from the calculated NO2 and the measured and calculated NOx contents.

BRIEF DESCRIPTION OF THE DRAWINGS

The present invention together may best be understood from the following detailed description of the embodiments, but not restricted to the embodiments, wherein is shown schematically.

Figure 1:
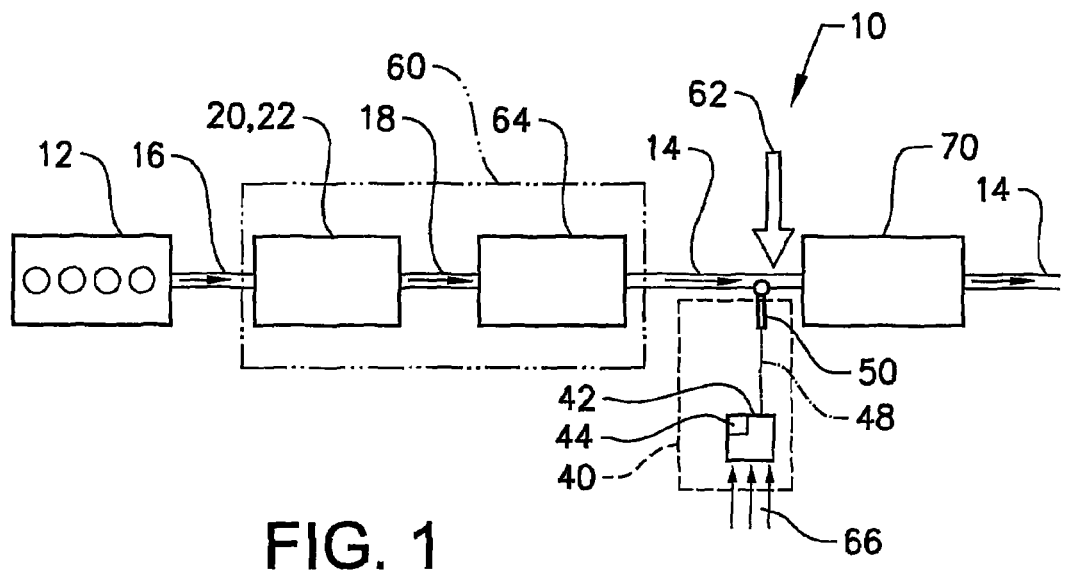
FIG. 1 a first embodiment of an exhaust aftertreatment system according to the invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

According to a first aspect of the invention a preferred exhaust gas after treatment system 12 depicted in FIG. 1 comprises a diesel particulate filter unit (DPFU) 60 arranged downstream of a diesel engine 12 and a NOx reducing unit 70 such as preferably a selective-catalytic-reduction (SCR) arrangement arranged downstream of said DPFU 60, wherein an injector 62 is provided for feeding reducing agent such as ammonia or urea into the exhaust gas and arranged downstream of said DPF 64 and upstream said SCR catalyst. The DPFU 60 comprises an oxidation catalyst stage (DOCS) 20, e.g. an oxidation catalyst (DOC) 22 and a diesel particulate filter unit (DPFU) 60 which is arranged downstream of the DOC 22. Optionally, the DPF 64 can exhibit an oxidizing catalytic coating which can replace the DOC 22 as oxidation stage 20 or which can at least support the DOC 22.

Between the DPFU 60 and the SCR catalyst a sensing unit 40 is provided for sensing the amount of NO2 contained in the exhaust entering the SCR catalyst. The sensing unit 40 comprises a NO2-sensitive sensor 50 arranged in the exhaust line 14 downstream of the DPFU 60 and upstream of the SCR catalyst and a control unit 42 connected to the sensor 50 via data line 48. Optionally a device 44 can be coupled to the control unit 42 to calculate the amount of NO2 entering the SCR catalyst depending on parameters 66, such as operating parameters of the engine 12 and/or on operating parameters of one or more catalysts 20, 64, 70 arranged in the exhaust aftertreatment system 10, providing a virtual sensor instead of a real NO2 sensor 50.

The DOCS 20, i.e. the DOC 22 and/or the catalytic coating of the DPF 64, is preferably used to generate a sufficient amount of NO2 for passive oxidation of soot trapped in the DPF 64 according to the reaction (R1) NO+NO2→NO2.

The main function of the DPF 64 is to trap particulate matter such as soot and ashes contained in the exhaust gas. A typical vehicular exhaust aftertreatment system 10 requires one to several 100,000 km driving to fill the DPF 64 with ashes, and the DPF 64 can be emptied from ash by demounting the DPF 64 at service. To fill the DPF 64 with soot requires only one to several 1000 km driving. However, the soot can be oxidized to CO2 which can be done during operation of the vehicle.

For some applications it may be beneficial to coat the DPF 64 with a catalytically active material including the properties of an oxidation catalyst into the DPF 64. For proper function of the DPF 64 it is recommended to control the amount of soot trapped in the DPF 64. Regeneration of the DPF 64 may be accomplished in various ways known in the art. Preferably, NO2 can be used for passive oxidation of the trapped soot according to the reaction is (R2) 2NO2+C→2NO+CO2.

For an efficient passive regeneration it is necessary to establish the exhaust gas temperature above a critical limit, preferably above 250° C., and to provide an adequate amount of NO2. The amount of NO2 in the exhaust gas fed into the DPF 64 can be increased by the DOCS 20 by oxidation of NO to NO2.

Depending in the engine 12 emissions of soot and nitrogen oxides NO, NO2, generally referred to as NOx, the passive oxidation of soot can keep the soot level in the DPF 64 low at exhaust temperatures above 250° C. For some engine emissions the ratio of NOx/soot is too low for oxidizing the soot by NO2. Alternative to passive oxidation of soot it can be oxidized by oxygen at high temperatures, preferably at about 600° C. This can be achieved by either providing a burner (not shown) in the exhaust aftertreatment system 10 or by adding fuel to the exhaust gas which is burnt on an oxidation catalyst (not shown) upstream of the DPF 64. Activation of the burner or adding fuel is done in a regeneration phase which has a typical duration of a few minutes and which can last as long as 30 min if necessary.

Downstream of the DPF 64 and upstream of the nitrogen-oxides reduction unit 70, by way of example an SCR catalyst, the exhaust gas contains one or more constituents as NO and NO2, which can be deoxidized in the SCR catalyst.

The main task of the SCR catalyst is to reduce NOx, i.e. NO and NO2, with a reductant to nitrogen gas N2 and water H2O. On the SCR catalyst ammonia NH3 reacts with NOx to form nitrogen. Usually on vehicles urea is injected into the exhaust gas and by the exhaust gas temperature urea is thermolyzed or hydrolyzed into NH3 in the exhaust gas and the SCR catalyst. The reductant, e.g. NH3 or urea, is added to the exhaust gas upstream of the SCR catalyst, for instance by the injector 62 (indicated by a broad arrow upstream of the SCR catalyst). The efficiency of the SCR catalyst is strongly dependent on the exhaust gas temperature, the space velocity of the exhaust gas and the NO2/NO ratio in the exhaust gas which enters the SCR catalyst.

Depending on the kind of NOx there are three principal chemical reactions possible:

(R3) 4NO+4NH3+O2→4N2+6H2O (R4) NO+NO2+2NH3→2N2+3H2O (R5) 6NO2+8NH3→7N2+12H2O

The reaction (R4) has the highest efficiency and is efficient from exhaust temperatures below 200° C. and above. Reaction (a) becomes efficient at 300° C. and for reaction (c) the efficiency is lower than reaction (a) on vanadium based SCR-catalyst while it is on zeolite-based catalyst more efficient than reaction (a) but not as efficient as reaction (b). Further, on zeolite-based catalyst an unfavourable competitive reaction to reaction (c) exist which is generating the greenhouse gas N2O:

(R6) 4NO2+4NH3→2N2O+2N2+6H2O.

The NO2 formation in the DOCS 20 will depend on the exhaust gas mass flow and the temperature of the DOCS 20. Besides the flow and temperature dependency, the DOC 22 and/or the catalytic coating in the DPF 64 adsorbs sulphur (S), which can be contained in the exhaust gas, at lower temperatures and releases the sulphur at temperatures above 350° C. If driving conditions let the DOCS 20 adsorb a lot of sulphur, the NO2 formation will be poisoned. The NO2 content after the DPF 64 will also depend on the condition of the DPF 64.

Sulphur is the main source to deactivate NO2 formation on the DOC 22 and on the catalytic coating of the DPF 64. Sulphur sticks to the catalyst at lower temperatures, typically below 400° C. and is released at higher temperatures (>400° C.). The actual temperatures for sulphur adsorption and desorption depend on the particular catalyst formulation.

When low sulphur diesel fuel is used, which is now generally available in Europe and USA, it will take several hours or a day of engine operation without reaching 400° C. to give a noticeable decrease in NO2 formation in the DOC 20 and/or the coated DPF 64. Such driving is unusual with heavy duty vehicles but can occur. However, sulphur poisoning of the DOC 22 and/or the coated DPF 64 can occur after shorter times if the driver gets fuel with higher sulphur contents, e.g. when driving in markets without low-sulphur fuel or fuelling high sulphur fuel by mistake. It's then important to detect such a poisoning and make a desulphation of the DOGS 22. Sulphur is removed from the DOC 22 and/or the coated DPF 64 by heating the catalysts to above 400° C. for more than 5 minutes, which can be done by injecting fuel into the exhaust or by activating a burner. Another source of sulphur is the lubricant oil.

Some conditions on some catalytic materials can cause a reversible degradation of the DOCS 20 in a manner that can it be reconditioned when heated to high temperatures above e.g. 500° C. for a predetermined time period, e.g. several minutes.

The desulphatisation temperature does not degrade the SCR-catalyst and during desulphatisation the SCR-catalyst gets a temperature where it works very efficient and the influence of NO2/NO ratio is low.

The description of the virtual sensor is a map or physical model of the NO2 formation in the DOC 22 and optionally in the DPF 64 if it's coated and on the NO2 consumption in the DPF 64. The sulphur dependency of the NO2 will not be included in the model since this invention is a way of handling the sulphur effect on NO2 (and it's hard to model also due to unknown variations of sulphur content in the fuel (low-sulphur fuel could be any thing below 10 ppm in Europe for example).

According to the invention, an NOx conversion is used for on-board-diagnosis of the correct function of the DOCS 20, i.e. the DOC 22 and/or the oxidizing catalytic coating of the DPF 64, if the DPF 64 is provided with such a coating. The NOx conversion is derived from temperature, exhaust gas mass flow and NO2 levels in the exhaust gas. The NO2 sensor can be a real, physical sensor 50 or a virtual sensor wherein the NO2 level is calculated based on an appropriate model described below.

A virtual NOx sensor is a rather complex model and comprises or consists preferably of following sub-models which are given in quotes:

"Engine-out NOx": The amount of NOx at the outlet of the engine 12 can be estimated by a sensor or a model with following inputs for example: load or fuel amount, timing for fuel injection, engine speed, intake air pressure, intake air temperature, EGR (EGR=exhaust gas recycling) amount and intake air humidity. These are parameters of the engine 12 and sensed values. There are several ways to build the model. It can be map-based where all or at least some of the relevant parameters are, or can be, corrected by correction factors laid down in the map. It can also be a model built on a neural network as base.

"Exhaust gas flow": The exhaust gas flow can be measured, or derived from the measured air intake flow and the fuel amount, or from the calculated air intake flow from engine speed, intake air pressure, intake air temperature, EGR amount and volumetric efficiency of the engine.

"Exhaust gas flow in oxidation catalyst": The exhaust gas flow in the DOCS 20 can be measured or calculated.

"Temperature in catalyst": The temperature can e.g. be measured upstream of the DOCS 20. By applying an appropriate signal filter the measured value together with the exhaust gas flow into the DOCS 20 as a parameter can represent the actual catalyst temperature. Alternatively the temperature can be calculated by using a simple heat balance.

"Sulphur in oxidation catalyst": The sulphur content in the DOCS 20 is preferably calculated. For instance the calculation can be derived from the parameters in parentheses: (sulphur content in catalyst)=(sulphur content in catalyst a second before)+(sulphur adsorbed from exhaust during a second)−(sulphur desorbed during a second). The parameter "sulphur adsorbed from exhaust during a second" is the sulphur content in the fuel and lubrication oil consumed during the said second multiplied with a factor, wherein the factor is between 0 and 1 and has a temperature dependency which can e.g. be derived from a map containing temperature dependent values of the factor. The parameter "sulphur desorbed during a second" is the sulphur content in the DOCS 20 one second before multiplied with another temperature dependent factor which can be derived in the same way as the first factor described above.

"NO2 formation in catalyst": The NO2 formation in the DOCS 20 can be derived from interpolating in a 3-D based on the parameters exhaust gas flow, temperature in catalyst and sulphur content. It can also be calculated using a physical model with sulphur content, temperature, exhaust gas flow and oxygen concentration as input parameters. The model can be e.g. a specific NO2 formation rate which is $k1 \cdot C_{NO} \cdot C_{O2}$ and an NO2 decomposition rate which is $k2 \cdot C_{NO2}$, where k1 and k2 are temperature dependent and sulphur-content dependent parameters and C is the concentration of NO, NO2 and O2, respectively. The specific rate is integrated over the catalyst volume. If there is a wide range of the HC content in the engine's working area or if an HC-injector is used, then the HC level is also an input parameter to the model, e.g. as a denominator for the specific rates $(1+K_a \cdot C_{Hc})$.

"NO2 out from the particulate filter": The amount NO2 which is released from the DPF 64 is the difference between the amount of NO2 fed into the DPF 64, NO2 formed in the DPF 64 (which is zero if no catalytic layer is provided in the DPF 64 for NO2 generation) and NO2 consumed by soot in the DPF 64. NO2 formed in the DPF 64 can be calculated in the same manner as the NO2 formed in the DOCS 20 (see above), preferably a physical model. NO2 consumed by soot in the DPF 64 is proportional to the amount of soot in the DPF 64 and can be expressed as a specific rate $k3 \cdot C_{NO2} \cdot C_{Soot}$— Again, k3 is a temperature dependent parameter and C the respective concentration of NO2 and soot.

"Soot load in particulate filter": The soot load in DPF 64 can be derived from a measured pressure drop over the DPF 64 and/or by applying a model: (soot in the DPF 64 at a current time)=(soot in the DPF 64 at a time before the current time)+(soot emitted by the engine during the current time)−(soot burnt by NO2 during the current time). Soot burnt by NO2 during the current time is given by the "NO2 out from particulate filter" model, soot emitted by the engine during the current time is given from a soot sensor or a similar model as the "Engine-out NOx" model.

The usage of a pressure drop for calculation of a soot amount in the DPF 64 can introduce some errors due to the fact that the soot characteristic is changing with time. Therefore it is preferred to use a model for calculating the soot load and use the pressure drop as a qualitative check of the model.

Figure 2A:
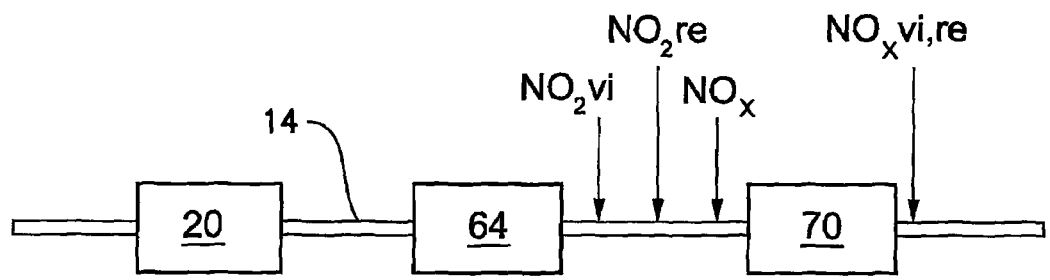
FIG. 2a, 2b preferred locations where NOx and NO2 levels can be determined.
Figure 2B:
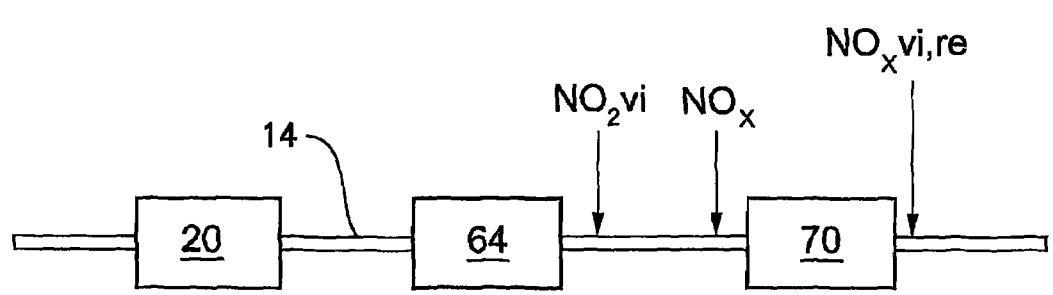

FIGS. 2a and 2b depict preferred example locations where the NO2 and NOx levels can be estimated either by measurement or calculation.

FIG. 2a corresponds to an arrangement preferably used at high loads of the engine 12 (FIG. 1), FIG. 2b corresponds to an arrangement preferably used al low loads of the engine 12 (FIG. 1).

From estimating NO2 and NOx contents in the exhaust gas at different locations an actual measured and estimated conversion of NO2 in the DPFU 60 and conversion NOx in the SCR catalyst can be derived. At high loads (FIG. 2a) it is preferred to measure the NO2 content in the exhaust gas upstream of the nitrogen-oxides reduction unit 70 and to calculate, i.e. estimate an expected NO2 content upstream of the nitrogen-oxides reduction unit 70. Additionally, the NOx content upstream of the nitrogen-oxides reduction unit 70 can be measured or calculated. Downstream of the nitrogen-oxides reduction unit 70 the NOx content is measured and calculated. A difference between the measured and the calculated contents indicates that a problem with the NO oxidation in the DPFU 60 has occurred.

At low loads (FIG. 2b) it is preferred to calculate the NO2 content in the exhaust gas yielding an estimated NO2 content upstream of the nitrogen-oxides reduction unit 70 and to calculate and/or to measure an expected NOx content upstream of the nitrogen-oxides reduction unit 70. Downstream of the nitrogen-oxides reduction unit 70 the NOx content is measured and calculated.

One or more temperatures sensors (not shown) are provided at convenient locations for determining the catalysts temperatures.

The NOx-conversion is determined based on these values and on the temperature, exhaust gas massflow and the estimated NO2 content.

Figure 3:
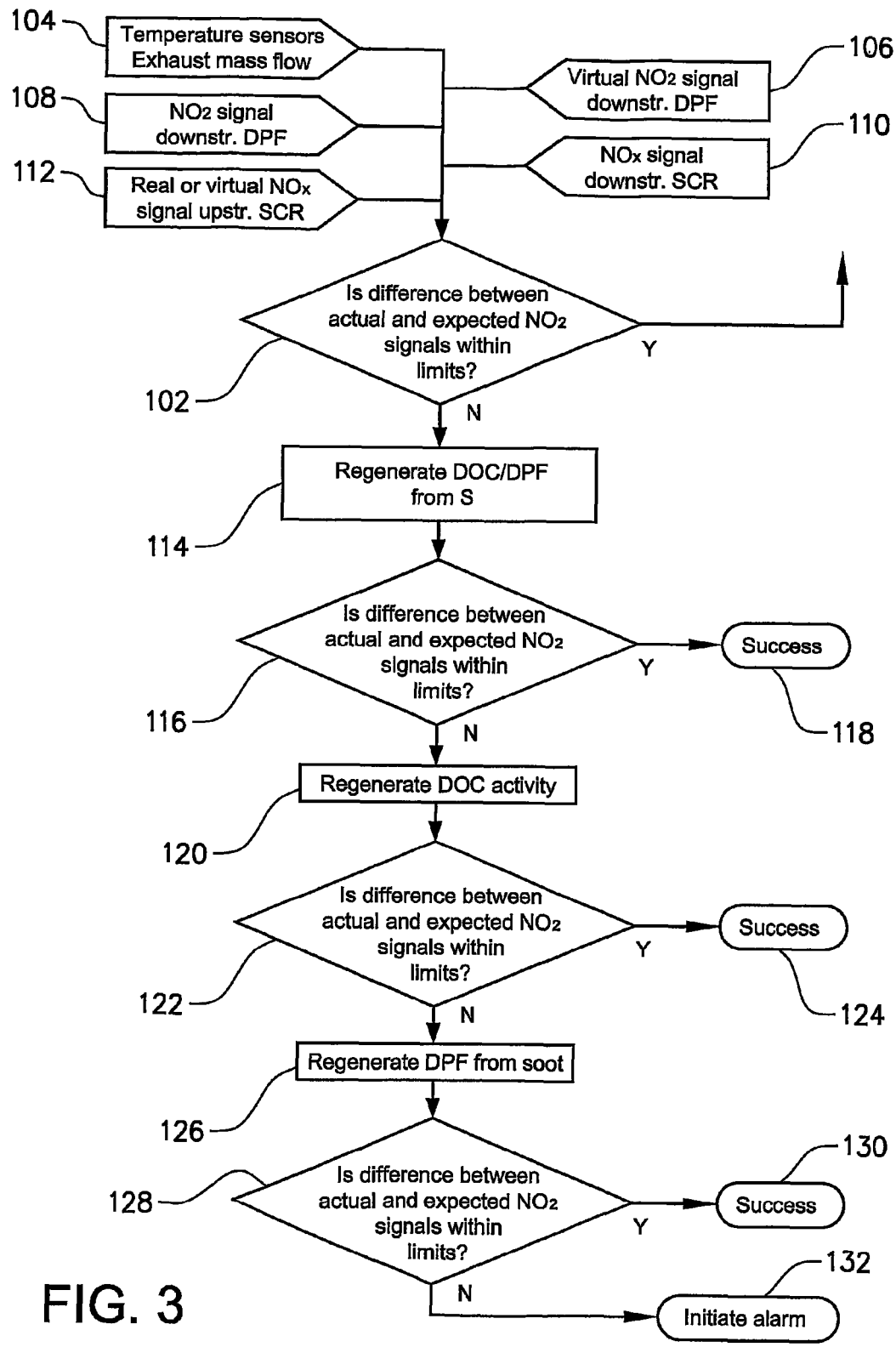
FIG. 3 a flowchart of a first preferred diagnosis method using a real NO2 sensor and virtual NOx and NO2 sensors according to the invention.

FIG. 3 illustrates a first embodiment of a preferred method of a preferred NO2 error handler for on-board diagnosis of the DPFU 60 according to the invention. An NO2 content measured with a real sensor and an estimated NO2 content calculated with the virtual sensor model are compared in step 102. By way of example, the nitrogen-oxides reduction unit 70 is a SCR catalyst. By comparing the NOx- and NO2 contents upstream and downstream of the SCR catalyst, the efficiency of the SCR catalyst can also be determined The comparison is based on the values of inputs 104 to 112 which comprise: input 104: temperature signals from one or more temperature sensors; exhaust gas mass flow; input 106: virtual NO2 signal downstream of DPF 64; input 108: NO2 signal measured by a real sensor 50 downstream of DPF 60 and upstream of SCR catalyst. If no reductant is injected into the SCR catalyst, the sensor 50 can be located downstream of the SCR catalyst; input 110: NOx sensor signal downstream of SCR catalyst; input 112: Real or virtual NOx signal upstream of SCR catalyst (can be upstream DPFU 60);

If the difference between the estimated virtual NO2-sensor signal and the measured real NO2-sensor signals is within predetermined limits, then the system is working properly and the NO2 error handler is finished and can jump back to step 102 for a next on-board diagnosis procedure. This can be done periodically with a predetermined time delay or can be done continuously.

If the difference is beyond predetermined limits, e.g. if the real NO2 signal is only a fraction of the virtual NO2 signal, for instance the real signal is e.g. 50% of the virtual signal or less, the NO2 error handler initiates a sulphur regeneration of the DPFU 60 in step 114, i.e. sulphur is removed from the DPFU 60. The DOCS 20 is regenerated in order to remove sulphur from the DOCS 20. If the DPF 64 is comprises alternatively or additionally an oxidizing catalytic coating, the DPF 64 is regenerated alternatively or additionally. The regeneration is done e.g. by control of the temperature and flow of exhaust gas from and/or fuel into the engine 12.

Preferably the conditioning is done at a temperature of at least 350° C., preferably at a temperature between 350° C. and 450° C.

After the regeneration the two signals are compared again in step 116. If the signals are within the predetermined limits, e.g. if they are nearly equal, the NO2 handler stores a fault code (step 118). The fault code indicates that a successful sulphur regeneration has been performed and that the DPFU 60, particularly the DOC 22, had been deactivated by sulphur oxidation. Then the NO2 error handler is finished and can jump back to step 102 for a next on-board diagnosis procedure.

If the two signals still deviate after the sulphur regeneration an oxidation-catalyst-activity conditioning is initiated in step 120. The regeneration can be done as before, e.g. by control of the temperature and flow of exhaust gas from and/or fuel into the engine 12. Preferably the conditioning is done at a temperature of at least 450° C., preferably at a temperature between 450° C. and 550° C.

Subsequently the two signals are compared in step 122 in the same manner as after the regeneration of the DPFU 60. If the signals are within the predetermined limits, e.g. if they are nearly equal, the NO2 handler stores a fault code (step 124). The fault code indicates that a successful sulphur regeneration has been performed and that the DPFU 60, particularly the DOC 22, had been deactivated by sulphur oxidation. Then the NO2 error handler is finished and can jump back to step 102 for a next on-board diagnosis procedure.

If the two signals still deviate, a soot regeneration of the DPF 64 is performed in step 126, e.g. a burner is activated and/or fuel is injected to oxidize the soot a high temperatures. The two signals are again compared in step 128. If the two signals are now within predetermined limits, the NO2 error handler sends a signal to a soot error handler indicating that there could have been more soot in the DPFU 60 than expected (step 130). Then the NO2 error handler is finished and can jump back to step 102 for a next comparison.

If the virtual and the real NO2 signals still deviate a fault code of a malfunctional DPFU 60 is set (step 132) and if necessary, e.g. if the NO2 is so low that the low level influences the NOx emission of the aftertreatment system 10, an alarm is set. An alarm is favourably activating a MIL (MIL=malfunction indicator light).

In a second, not depicted embodiment of the invention the first comparison between the two NO2 signals is also compared (if possible) with the efficiency of the SCR catalyst. This can be reasonably done when the SCR catalyst is in a state where there is a measurable difference in efficiency as a function of NO2/NO ratio. If the efficiency is as expected from the virtual NO2 signal a fault code is set on the real NO2 sensor. The real efficiency can for example be expressed as a conversion 1-[Input 110]/[Input 112]. The expected conversion (i.e. efficiencies) can then be found in a map with temperature, mass flow, NOx signal upstream the SCR catalyst and NO2 signals upstream the SCR catalyst.

Figure 4:
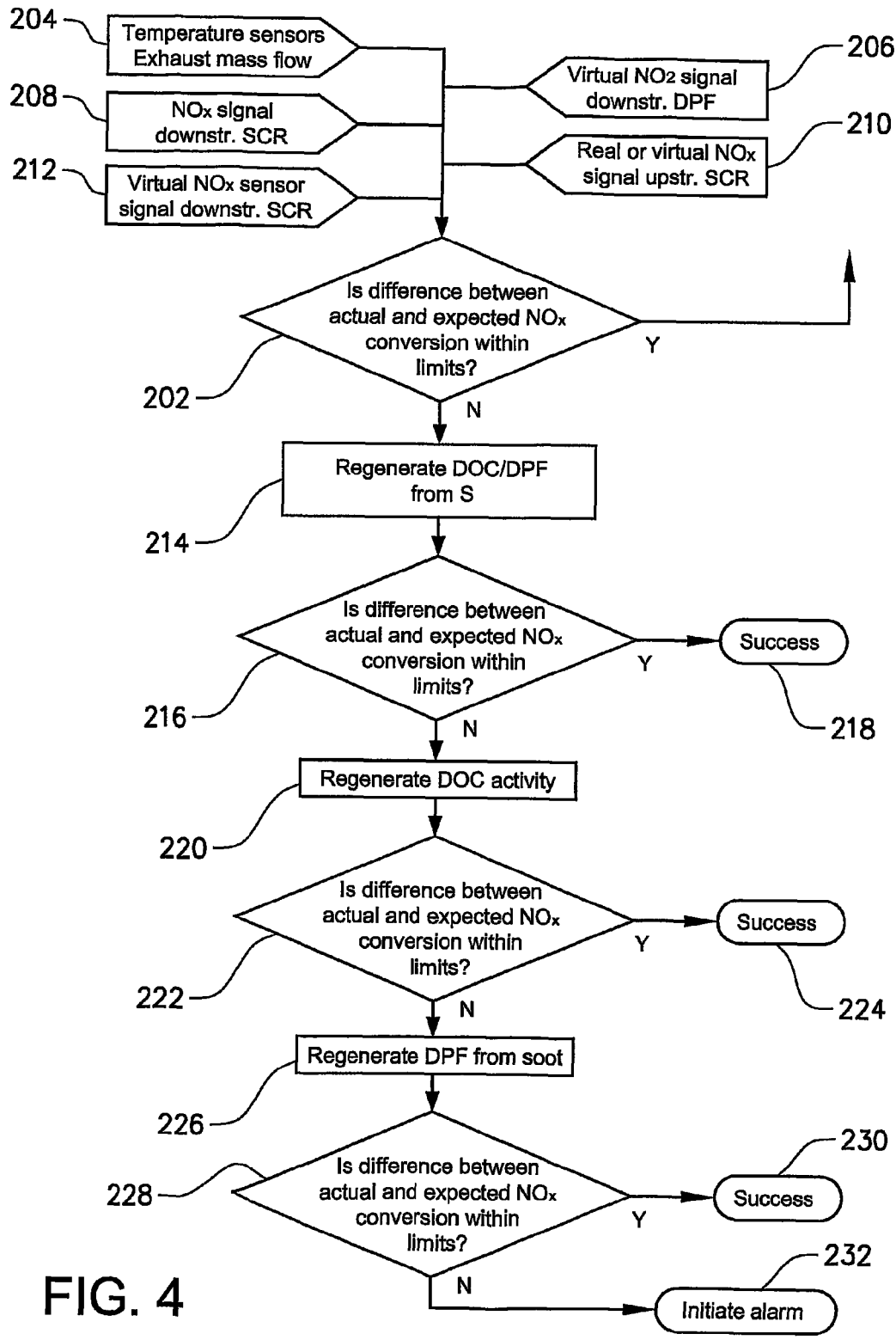
FIG. 4 a flowchart of a second preferred diagnosis method using virtual NOx and NO2 sensors according to the invention.

Referring now to FIG. 4 a third embodiment of the preferred NO2 error handler is presented. This flow chart corresponds to an arrangement depicted in FIG. 2b related to low engine loads. By way of example, the nitrogen-oxides reduction unit 70 is a SCR catalyst. Deviating from the first embodiment in FIG. 3 there is no real NO2 sensor 50 and the estimated NO2 content is calculated instead with the virtual sensor model. A measured and an estimated NOx conversion of the SCR catalyst is compared in step 202 based on the estimated NO2 content and the estimated temperature signal on the SCR catalyst, preferably based on temperature, exhaust gas mass flow and NO2 level downstream of the DPFU 60 and upstream of the SCR catalyst. By comparing the NOx- and NO2 contents upstream and downstream of the SCR catalyst, the efficiency of the SCR catalyst can be determined.

The comparison is based on the values of inputs 204 to 212 which comprise: input 204: temperature signal of one or more temperature sensors, exhaust gas mass flow; input 206: virtual NO2 signal downstream of DPF 64 and upstream of the SCR catalyst; input 208: NOx sensor signal downstream of the SCR catalyst; expected based on the NO2-sensor signal of the virtual sensor; input 210: real or virtual NOx sensor signal upstream of the SCR catalyst (can be upstream DPFU 60); input 212: virtual NOx signal downstream of SCR catalyst (preferably based on inputs 204, 206, and 210).

If the deviation of the real estimated efficiency of the SCR catalyst (based on the virtual sensor signal) from the expected efficiency is above a predetermined threshold the same procedure is done as in FIG. 3. If the difference between the two efficiency values of the example SCR catalyst is within predetermined limits, then the NO2-handler can jump back to step 202 and is ready for the next onboard diagnosis procedure. This can be done periodically with a time delay of continuously.

If the difference is beyond predetermined limits, then the NO2 error handler initiates a sulphur regeneration of the DPFU 60 in step 214. A condition beyond predetermined limits is e.g. if the real efficiency value (based on measured signals) is only a fraction of the estimated value (based on calculated signals). The DOCS 20 is regenerated in order to remove sulphur from the oxidizing catalytic material of the DOC 20. If the DPF 64 comprises, alternatively or additionally, an oxidizing catalytic coating, the DPF 64 is regenerated alternatively or additionally. The regeneration is done e.g. by control of the temperature and flow of exhaust gas from and/or fuel into the engine 12. Preferably the conditioning is done at a temperature of at least 350° C., preferably at a temperature between 350° C. and 450° C.

After the regeneration the two signals are compared again in step 216. If the signals are within the predetermined limits, e.g. if they are nearly equal, the NO2 handler stores a fault code (step 218). The fault code indicates that a successful sulphur regeneration has been performed and that the DPFU 60, particularly the DPF 64, had been deactivated by sulphur oxidation. Then the NO2 error handler is finished and can jump back to step 202 for the next on-board diagnosis procedure.

If the two signals still deviate after the sulphur regeneration an oxidation-catalyst-activity conditioning is initiated in step 220. The regeneration can be done as before, e.g. by control of the temperature and flow of exhaust gas from and/or fuel into the engine 12. Preferably the conditioning is done at a temperature of at least 450° C., preferably at a temperature between 450° C. and 550° C.

Subsequently the two signals are compared again in step 222 in the same manner as after the regeneration of the DPFU 60. If the signals are within the predetermined limits, e.g. if they are nearly equal, the NO2 handler stores a fault code (step 224). The fault code indicates that a successful sulphur regeneration has been performed and that the DPFU 60, particularly the DOCS 20, had been deactivated by sulphur oxidation. Then the NO2 error handler is finished and can jump back to step 202 for the next on-board diagnosis procedure.

If the two signals still deviate, a soot regeneration of the DPF 64 is performed in step 226. The two signals are again compared in step 228. If the two signals are now within predetermined limits, the NO2 error handler sends a signal to a soot error handler indicating that there could have been more soot in the DPFU 60 than expected (step 230). Then the NO2 error handler is finished and can jump back to step 202 for the next on-board diagnosis procedure.

If the estimated and the measured NO2 signals still deviate a fault code of a malfunctional DPFU 60 is set (step 232) and if necessary, e.g. if the NO2 is so low that the low level influences the NOx emission of the aftertreatment system 10, a separate diagnosis for the SCR catalyst and a reducing agent system coupled to the SCR catalyst is initiated.

In a forth embodiment (not shown) some or all SCR catalyst diagnosis and a reducing agent system coupled to the SCR catalyst is performed before starting sulphur regeneration.

The invention claimed is:

1. An exhaust aftertreatment system of an engine comprising a diesel particulate filter unit which encompasses a particulate filter in which soot can be oxidized by NO2 and constituents of the exhaust gas are deoxidized in a nitrogen-oxides reduction unit arranged downstream of the diesel particulate filter unit, wherein the exhaust gas flows from the diesel particulate filter unit to the nitrogen-oxides reduction unit, wherein the operability of the diesel particulate filter unit is determined with a control unit configured to perform on-board-diagnosis method comprising:
   (a) utilizing a calculation model to provide a virtual, estimated NO2 content upstream of the nitrogen-oxides reduction unit;
   (b) receiving signals from at least one sensing unit that measures at least one of an NOx or NO2 content upstream of the nitrogen-oxides reduction unit;
   (c) performing a comparison between the estimated and the measured contents; and
   (d) based on a result of the comparison, controlling conditioning equipment to perform at least one conditioning step of the diesel particulate filter unit.

2. The system according to claim 1, wherein the sensing unit comprises a NO2 sensor upstream of the nitrogen-oxides reduction unit and downstream of the diesel particulate filter unit.

3. The system according to claim 1, wherein the sensing unit comprises a NOx sensor downstream of the nitrogen-oxides reduction unit.

4. The system according to claim 1, wherein the control unit is configured to calculate an NO2 and/or NOx content in the exhaust gas flow.

5. The system according to claim 1, wherein the sensing unit measures the at least one of an NOx or NO2 content downstream of the diesel particulate filter unit.

6. An on-board-diagnosis method for an exhaust aftertreatment system of an engine comprising a diesel particulate filter unit which encompasses a particulate filter in which soot can be oxidized by NO2 and constituents of the exhaust gas are deoxidized in a nitrogen-oxides reduction unit arranged downstream of the diesel particulate filter unit, wherein the exhaust gas flows from the diesel particulate filter unit to the nitrogen-oxides reduction unit, comprising:
   (a) utilizing a calculation model to provide a virtual, estimated NO2 content upstream of the nitrogen-oxides reduction unit;
   (b) measuring at least one of an NOx or NO2 content upstream of the nitrogen-oxides reduction unit;
   (c) performing a comparison between the estimated and the measured contents; and
   (d) based on a result of the comparison, performing at least one conditioning step of the diesel particulate filter unit.

7. The method according to claim 6, comprising
   (a) measuring the NO2 content in the exhaust gas upstream of the nitrogen-oxides reduction unit and downstream of the diesel particulate filter unit;
   (b) calculating the NO2 content in the exhaust gas upstream of the nitrogen-oxides reduction unit and downstream of the diesel particulate filter unit;
   (c) measuring an NOx content in the exhaust gas downstream of the nitrogen-oxides reduction unit;
   (d) measuring or calculating an NOx content in the exhaust gas upstream of the nitrogen-oxides reduction unit and downstream of the diesel particulate filter unit;
   (e) comparing the measured and the calculated NO2 contents; and
   (f) based on the result of the comparison deciding on at least one conditioning step of the diesel particulate filter unit.

8. The method according to claim 6, comprising
   (a) calculating the NO2 content in the exhaust gas upstream of the nitrogen-oxides reduction unit and downstream of the diesel particulate filter unit;
   (b) measuring or measuring and calculating an NOx content in the exhaust gas upstream of the nitrogen-oxides reduction unit and downstream of the diesel particulate filter unit;
   (c) measuring the NOx content in the exhaust gas downstream of the nitrogen-oxides reduction unit;
   (d) deriving the actual and the expected NOx conversion from the calculated NO2 and the measured and calculated NOx contents.

9. The method according to claim 8, comprising performing a conditioning step of the at least one conditioning step if the difference between the compared NOx conversions or the NO2 signals are beyond a predetermined value.

10. The method according to claim 8, comprising deriving the NO2 content in the exhaust gas with a real sensor and/or a virtual sensor.

11. The method according to claim 8, comprising deriving the NOx conversion and/or the NO2 signals in the exhaust gas by determining an efficiency of the nitrogen-oxides reduction unit.

12. The method according to claim 6, wherein a first conditioning step is performed by heating an oxidation stage in the diesel particulate filter unit to at least 350° C.

13. The method according to claim 12, comprising setting an alarm if the first conditioning step is performed unsuccessfully.

14. The method according to claim 6, wherein a second conditioning step is performed by heating an oxidation stage in the diesel particulate filter unit to at least 450° C.

15. The method according to claim 14, wherein a third conditioning step is performed by heating an oxidation stage in the diesel particulate filter unit to at least 550° C.

16. The method according to claim 15, wherein the third conditioning step is performed after the second conditioning step.

17. The method according to claim 14, wherein the second conditioning step is performed after the first conditioning step.

18. The method according to claim 1, comprising measuring the at least one of the NOx or NO2 content downstream of the diesel particulate filter unit.

19. A non-transitory computer readable medium, comprising a program code for use in an on-board-diagnosis method for an exhaust aftertreatment system of an engine comprising a diesel particulate filter unit which encompasses a particulate filter in which soot can be oxidized by NO2 and constituents of the exhaust gas are deoxidized in a nitrogen-oxides reduction unit arranged downstream of the diesel particulate filter unit, wherein the exhaust gas flows from the diesel particulate filter unit to the nitrogen-oxides reduction unit, comprising at least the steps of
(a) utilizing a calculation model to provide a virtual, estimated NO2 content upstream of the nitrogen-oxides reduction unit;
(b) measuring at least one of an NOx or NO2 content upstream of the nitrogen-oxides reduction unit;
(c) performing a comparison between the estimated and the measured contents; and
(d) based on a result of the comparison, performing at least one conditioning step of the diesel particulate filter unit.

* * * * *